United States Patent
Terae et al.

[11] Patent Number: 5,169,919
[45] Date of Patent: Dec. 8, 1992

[54] FINE POWDER OF EPOXY-CONTAINING SILICONE ELASTOMER AND A METHOD FOR MANUFACTURING THE SAME

[75] Inventors: Nobuyuki Terae; Yoshinori Inoguchi; Masanori Sudo, all of Gunma, Japan

[73] Assignee: Shin-Etsu Chemical Company, Limited, Tokyo, Japan

[21] Appl. No.: 705,001

[22] Filed: May 28, 1991

[30] Foreign Application Priority Data

May 28, 1990 [JP] Japan .................... 2-137925

[51] Int. Cl.$^5$ .............................. C08G 77/06
[52] U.S. Cl. ........................ 528/15; 528/31; 528/32
[58] Field of Search ............. 528/15, 32, 31

[56] References Cited

U.S. PATENT DOCUMENTS

| | | | |
|---|---|---|---|
| 3,996,195 | 12/1976 | Sato et al. | 528/15 |
| 4,077,943 | 3/1978 | Sato et al. | 528/15 |
| 4,721,764 | 1/1988 | Fujiki et al. | 528/15 |
| 4,743,670 | 5/1988 | Yoshida et al. | 528/15 |
| 4,849,564 | 7/1989 | Shimizu et al. | 528/31 |
| 5,051,467 | 9/1991 | Okinoshima et al. | 528/15 |

*Primary Examiner*—Melvyn I. Marquis
*Assistant Examiner*—Karen A. Hellender
*Attorney, Agent, or Firm*—Millen, White, Zelano and Branigan

[57] ABSTRACT

A fine powder of an epoxy-containing silicone elastomer can be made by:
(i) dispersing in water a hardenable organopolysiloxane compound composed of (A) an organopolysiloxane of 20–100,000 cS at 25°

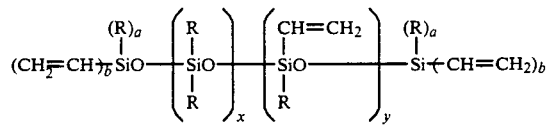

(R's are the same or different unsubstituted or substituted hydrocarbon groups containing no unsaturated bond; subscripts a and b are integers selected from 0, 1, 2 and 3 such that $a+b=3$; x is a positive integer; y is 0 or a positive integer such that $2b+y \geq 2$);

(B) an organohydrogenpolysiloxane containing, in a molecule, at least two hydrogen atoms bonded to silicon and at least one epoxy-bearing organic group bonded to silicon $$R_c A_d (H)_e SiO_{\frac{4-c-d-e}{2}}$$

(R is the same as above; A is an epoxy-bearing organic group; c is a number from 0 to 3, and d and e are numbers from 0.005 to 2.0 such that $0.8 < c + d + e < 3$);

(C) a Pt-containing catalyst;

(ii) hardening the particles dispersed in the aqueous emulsion to thereby obtain a silicone elastomer emulsion of particles having a mean diameter of 20 μm or smaller; and (iii) adding an inorganic salt to the emulsion to thereby coagulate and separate the hardened dispersion particles.

7 Claims, No Drawings

FINE POWDER OF EPOXY-CONTAINING SILICONE ELASTOMER AND A METHOD FOR MANUFACTURING THE SAME

BACKGROUND OF THE INVENTION

The present invention relates to a fine powder of epoxy-containing silicone elastomer and a method of manufacturing the same. More particularly, for example, the invention relates to a fine powder of epoxy-containing silicone elastomer which does not undergo self-welding, is highly miscible with different kinds of organic resins, and effectively modifies such organic resins. The invention also concerns a method of making such powder which involves formation of a silicone elastomer emulsion and separation of fine elastomer powder therefrom.

Several proposals have been made for methods for manufacturing particulate or granular silicone elastomers. For example, U.S. Pat. No. 3,843,601 discloses a method wherein hardened silicone elastomer is cooled at a temperature below the glass transition temperature and then pulverized. Japanese Patent Kokai No. 59-96122 (1984) discloses a method wherein an addition reaction-type hardenable organosiloxane compound is hardened by means of a spray dryer at a temperature of 230°-300° C. to thereby obtain particulate silicone elastomer. Japanese Patent Kokai No. 62-270660 (1987) discloses a method wherein an addition reaction-type or condensation-type hardenable organopolysiloxane compound is self-mixed under a low shearing stress whereby the compound is hardened and granulated. In these proposed methods it was difficult to obtain fine and regularly-sized particles, a specially designed apparatus was required, and control of the hardening rate was difficult. Due to these drawbacks, these methods were not considered industrially advantageous.

Japanese Patent Kokai No. 56-36546 (1981) teaches a method which comprises emulsifying an organosiloxane compound consisting of an organopolysiloxane having terminal vinyl group(s) and an organohydrogenpolysiloxane having Si-bonded hydrogen atom(s) with water and a surface active agent, and heating and thus hardening the emulsion after it is mixed with a Pt-containing catalyst to thereby obtain an emulsion containing silicone elastomer powder. However, this literature does not describe separation of the hardened silicone elastomer in particulate form.

Various methods have been proposed for separating the particles of silicone elastomer existing in water in the form of a dispersion or emulsion. (ref. Japanese Patent Kokai Nos. 62-243621 (1987), 62-257939 (1987), 63-77942 (1988), 64-56735 (1989), 64-70558 (1989), Japanese Patent Kokoku 63-65692 (1988)). According to these methods, it is possible to control the particle size through control of the emulsion preparation conditions and selection of emulsifier. Also, it is possible to control the degree of refining by washing the emulsion in a continuous process to remove impurities. However, in these methods, since the particles formed in the emulsion are so fine, separation is difficult.

Japanese Patent Kokai Nos. 62-243621 and 63-77942 disclose a method wherein a hardenable liquid silicone rubber compound is combined with a surface active agent at a temperature below 25° C. where the compound does not harden to thereby produce an aqueous emulsion. The emulsion is then dispersed in water of a temperature higher than 25° C. to allow formation of particulate rubber. In this method, control of the hardening reaction was difficult; thus, the particles merge with each other while hardened and form rubber particles. Consequently, it was impossible to separate sufficiently fine particles.

Incidentally, a method is known for destroying an emulsion, according to which a salt or an alcohol is added to the emulsion to thereby deactivate the surface active agent holding the emulsion particles. When this method is applied to an emulsion of a silicone elastomer, the deactivation is accompanied by condensation and merging of particles so that it is difficult to control the particle size and to effectively obtain well separated particles (ref. Japanese Patent Kokoku No. 62-257939).

As for the applications of silicone elastomer compounds in the form of or containing hardened silicone elastomer particles, there are several. For example, Japanese Patent Kokoku Nos. 62-28971 (1987) and 63-12489 (1988), Japanese Patent Kokai Nos. 55-3412 (1980), 61-101519 (1986), 61-166823 (1986), and 61-225253 (1986) discuss thermally hardenable epoxy resin compounds which are obtained by adding to an epoxy resin a silicone elastomer compound containing spherical particles of organopolysiloxane elastomer which is hardened through an addition or condensation reaction in the presence of Pt-containing catalyst, or heating in the presence of organic peroxide. In applications wherein a fine powder of such silicone elastomer is used as an agent to improve shock resistance or lubricity of thermoplastic resins or thermosetting resins, introduction of a functional group such as an epoxy group into this fine powder compound strengthens its miscibility and adhesion tendency with respect to different organic resins.

In fact, a number of silicone oils are known in which a functional group such as an epoxy group is introduced. Introduction of such a functional group in silicone elastomer fine powders was carried out, for example, in Japanese Patent Kokai Nos. 64-70558 (1989) and 64-56735 (1989). In these disclosures, a liquid silicone elastomer compound consisting of (i) an organopolysiloxane containing hydroxyl or alkenyl groups bonded to a silicon atom, (ii) an organohydrogenpolysiloxane containing hydrogen atoms bonded to a silicone atom, (iii) a catalyst for hardening, and (iv) an unsaturated hydrocarbon group-containing epoxy compound or an alkoxyl silane containing a functional group such as epoxy, is dispersed and hardened in water, and stripped of water by a spray dryer or the like. Silicone elastomer particles are thus obtained. However, in the silicone elastomer particles manufactured by this method, only part of the epoxy-containing compound is bonded to the elastomer molecule, while most of the compound is merely mixed in the silicone elastomer particles in unreacted form. For this reason, the physical properties of the elastomer particles are poor and the miscibility with different kinds of organic resins attributable to inclusion of a functional group cannot be sufficient attained.

In a method wherein a cross-linked rubber compound is hardened through condensation, some of the hydroxyl groups bonded to silicon atoms and some of the cleaved epoxy groups tend to undergo condensation prompted by a condensation catalyst so that the epoxy groups in the elastomer behave as crosslinking groups to thereby cause gel hardening. In methods wherein a cross-linked rubber compound is hardened through an addition reaction, it is difficult to control the hardening since the addition and crosslinking of epoxy-containing unsaturated compounds take place simultaneously.

Furthermore, the inventors proposed in Japanese Patent Kokoku No. 1-308187 (1989) a method for manufacturing a fine powder of epoxy-containing silicone elastomer made from a hardenable organopolysiloxane compound mainly consisting of (i) an organopolysiloxane containing in a molecule at least two vinyl groups bonded to silicon atoms and at least one epoxy-bearing organic group bonded to a silicon atom, (ii) an organohydrogenpolysiloxane containing in the molecule at least two hydrogen atoms bonded to silicon and (iii) a Pt-containing catalyst. According to this method, although a desirable fine powder of silicone elastomer is obtained, the preparation of the organopolysiloxane (i) requires two steps, namely an addition reaction and a rearrangement equilibration reaction in the presence of a basic compound, which renders the operation complicated and costly.

SUMMARY OF THE INVENTION

As can be understood from the above description, a need continues to exist for an improved method for manufacturing a fine powder of epoxy-containing silicone elastomer which can produce, in a simple and stable manner, fine particles free of flocks, which are well miscible with different kinds of organic resins and capable of improving the properties of such different kinds of organic resins when mixed with them.

The present invention solves or ameliorates the above problems by providing a fine powder of epoxy-containing silicone elastomer having the above desirable characteristics and a manufacturing method to obtain such a fine powder.

According to the invention, a method is provided for obtaining a fine powder of epoxy-containing silicone elastomer comprising:

(i) dispersing in water a hardenable organopolysiloxane compound comprising mainly (A) an organopolysiloxane having a viscosity of 20-100,000 cS at 25° C. and having a general formula

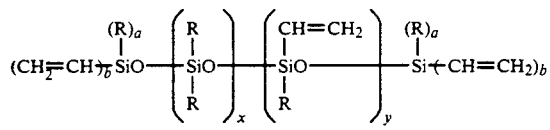

wherein the R's are the same or different, unsubstituted or substituted hydrocarbon groups containing no unsaturated bond; subscripts a and b are integers selected from 0, 1, 2 and 3 such that $a+b=3$; x is a positive integer; and y is 0 or a positive integer such that $2b+y \geq 2$;

(B) an organohydrogenpolysiloxane containing, in a molecule, at least two hydrogen atoms bonded to silicon and at least one epoxy-bearing organic group bonded to silicon and having a general formula

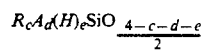

wherein R is the same as above; A is an epoxy-bearing organic group; c is a number from 0 to 3, and d and e are numbers from 0.005 to 2.0 such that $0.8 < c+d+e < 3$; and (C) a Pt-containing catalyst;

(ii) hardening the particles dispersed in the aqueous medium (emulsion) to thereby obtain a silicone elastomer emulsion of particles having a mean diameter of 20 μm or smaller;

(iii) adding an inorganic salt to the emulsion to thereby coagulate and separate the hardened dispersion particles;

(iv) isolating the particles, e.g., by filtration; and (v) preferably, washing and drying the particles.

The invention also relates to the fine powder of epoxy-containing silicone elastomer manufactured by the above method of the invention and to the fine powder consisting essentially of an addition polymer of (A) and (B) as defined above.

Thus, the inventors' accomplishment of the present invention involved realizing the possibility that a fine powder of epoxy-containing silicone elastomer having excellent properties is obtained simply and easily when a composition comprising an organopolysiloxane having vinyl groups bonded to silicon and an organopolysiloxane having hydrogens bonded to silicon and epoxy-bearing organic groups bonded to silicon is dispersed in and emulsified with water, and the emulsion is converted to an elastomer through an addition reaction.

In the invention, element (A) is an organopolysiloxane represented by the following general formula

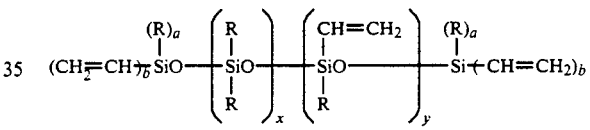

In this formula, R's are unsubstituted or substituted monovalent hydrocarbon groups containing no unsaturated bond. Examples include: alkyl groups, e.g., of 1-6 C atoms, e.g., methyl, ethyl, isopropyl, butyl, hexyl; cycloalkyl groups, e.g., of 5-7 C atoms, e.g., cyclohexyl, cycloheptyl; aryl groups and (C$_{1-4}$-alk)aryl groups, e.g., phenyl, methylphenyl, ethylphenyl; hydrocarbon halides, e.g., 3,3,3-trifluoropropyl. Suitable substituents include C$_{1-4}$-alkyl and halo-(F,Cl). It is however preferable that more than 90% of the R's be methyl.

It is necessary that at least two vinyls are contained in a molecule of element (A). Furthermore, to obtain good elastomer properties the vinyl content should be 0.005 to 1.0 mol per 100 g of element (A), namely the organopolysiloxane; or more preferably, the content should be 0.01 to 0.6 mol. The vinyls can be bonded to the ends and/or side chains of the molecule; it is however preferable that the ends of the molecule bear vinyls.

As described above the viscosity of element (A) at 25° C. ought to be 20 to 100,000 cS, or preferably 50 to 20,000 cS. Values of x and y correspondingly are determined. If the viscosity is less than 20 cs, the volatility of element (A) is so high that the element is hard to handle. On the other hand, if the viscosity is greater than 100,000 cS, the dispersion and emulsification becomes difficult.

The following general formula represents some examples of element (A):

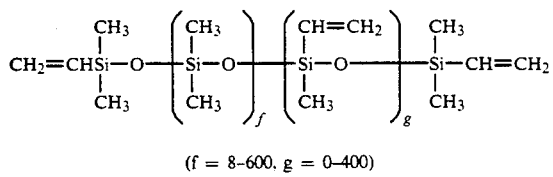

(f = 8-600, g = 0-400)

It is possible to manufacture these vinyl-containing organopolysiloxanes by known polymerization and equilibration methods.

Element (B) is an organohydrogenpolysiloxane represented by the following average formula:

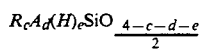

R can be selected form the same groups as those in the formula for element (A); A is an epoxy-containing organic group. In order to attain the object of the invention c must be a number from 0 to 3, and d and e must be from 0.005 to 2.0 such that $0.8 < c+d+e < 3$; in one molecule of element (B) are contained at least two hydrogens bonded to silicon and at least one epoxy-bearing organic group bonded to silicon.

Examples of suitable R groups are the same as those listed for element (A). It is again preferred that more than 90% of R's be methyl.

In the formula, A represents epoxy-bearing organic groups such as:

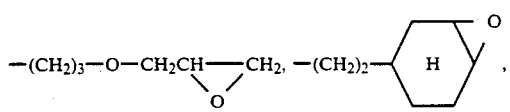

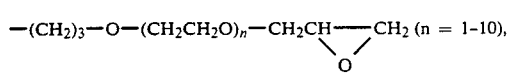

-continued

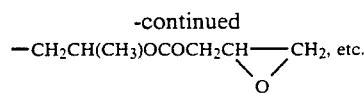

The precise structure of A is not critical.

It is preferred that the content of the epoxy-bearing organic group in element (B) be such that when the resulting elastomer powder produced as element (B) undergoes an addition reaction with element (A) and is analyzed in the manner hereinafter described, the amount of epoxy-bearing organic group per 100 g of elastomer powder will be 0.001 to 0.20 mol. The preferred content of epoxy group per 100 g of element (B) is from 0.003 to 0.80 mol, or more preferably from 0.005 to 0.60 mol.

The number of hydrogen atoms bonded to silicon atom is two or greater per molecule of element (B), or the content of hydrogen atom in element (B) is 0.005 to 1.60 mol per 100 g of element (B), or more preferably 0.01 to 1.20 mol per same.

The molecular structure of element (B) can be that of a straight chain, cyclic chain or cross-linked network; but straight chains and branched chains are preferred. The viscosity of element (B) at 25° C. is preferably 20 to 100,000 cS, or more preferably 50 to 20,000 cS, for the same reasons as stated for element (A).

The following general formulas represent some examples of element (B):

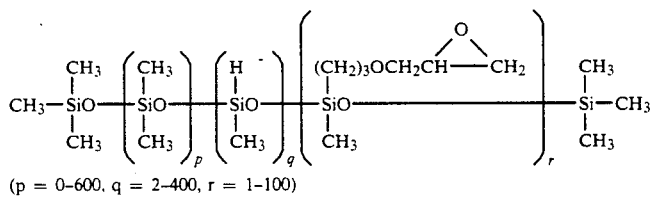

(p = 0-600, q = 2-400, r = 1-100)

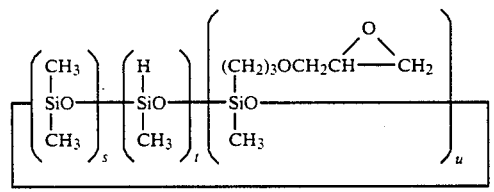

(s = 0-4, t = 2-4, u = 1-4)

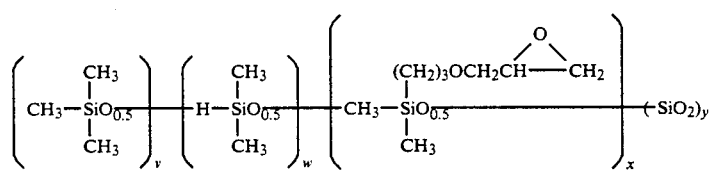

The methylhydrogenpolysiloxanes having epoxy-bearing organic groups as shown above can be synthesized conventionally by: first producing methylhydrogenpolysiloxane through ring-opening polymerization involving, for example, cyclic siloxanes having dimethylsiloxane units and methylhydrogensiloxane units, on one hand, and straight-chain siloxanes having terminal trimethylsiloxane units, on the other hand; then allowing the methylhydrogenpolysiloxane to undergo addition reaction with an epoxy compound having unsaturated hydrocarbon groups in the presence of a Pt-containing catalyst, the epoxy compound being in an amount smaller than the stoichiometrically equivalent mol number.

This addition reaction can be conducted in a well known method. For example, the addition can be effected using the following procedure: in a solventless system or a diluted system of an organic solvent, such as toluene, xylene, and isopropyl alcohol, the methylhydrogenpolysiloxane is mixed with Pt-containing catalyst in an amount of 5-50 ppm, calculated in terms of Pt, per 100 ppm of polysiloxane, and an epoxy compound having unsaturated hydrocarbon group is dripped into the mixture being stirred at a temperature from 80 to 120° C. As the addition reaction is completed, an adsorbent such as activated carbon is added to adsorb and remove the Pt-containing catalyst from the reaction mixture in order to prevent gelatinization caused by dehydrogenation; then, if necessary, by stripping the organic solvent, the siloxane is obtained.

A methylhydrogenpolysiloxane having epoxy-bearing organic groups thus obtained will possess at least two

units per molecule. For the purpose of ensuring appropriate elastomeric properties, it is preferred that in the above addition reaction system the molar ratio of

units to the unsaturated hydrocarbon units

namely a molar ratio

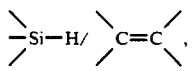

be 1.5 or greater, or more preferably from 2.0 to 50.0. If this molar ratio is less than 1.5, the performance of the methylhydrogenpolysiloxane as an elastomer crosslinking agent becomes poor.

Element (C) used in the invention is a catalyst for the addition reaction between the vinyl groups bonded to silicon of element (A) and the hydrogen atoms bonded to silicon of element (B), and can be any conventional Pt-containing catalyst. Examples include platinum black; platinum supported on silica; chloroplatinic acid; alcohol solution of chloroplatinic acid; complex salts resulting from the reactions of chloroplatinic acid with aldehyde, various olefins, vinyl siloxane, etc.

The fine powder of the inventive silicone elastomer is obtained as these elements (A), (B), and (C) are mixed in respective predetermined amounts, emulsified, and hardened while keeping the mixture dispersed. The mixture proportion of element (A) and element (B) can be varied through a wide range depending on the molecular weights of the elements and the target physical properties of the elastomers after hardening as can routinely be determined; however, it is desirous that the molar ratio of the groups

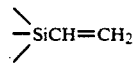

bonded to silicon in element (A) to the

groups in element (B) be in the range 2:1 to 1:10. The dosage of element (C) may be any catalytically effective amount; if the dosage is less than 0.1 ppm per 100 ppm of the total amount of elements (A) and (B), the addition reaction does not proceed sufficiently, and if the dosage exceeds 1,000 ppm, the reaction proceeds too promptly at the sacrifice of economy. Therefore, the catalyst is dosed in an amount of from 0.1 to 1,000 ppm, preferably from 1 to 100 ppm.

To manufacture the fine powder of silicone elastomer according to the inventive method, it is necessary to disperse the combination of elements (A), (B) and (C) in water; then as elements (A), (B), and (C) mix with each other, hardening occurs immediately. If this hardening reaction proceeds too promptly, the mixing fails to keep up with the hardening so that the resulting product exhibits non-uniformity in hardness. Similarly, if the emulsification does not keep up with the hardening, the emulsion cannot continue to form. To avoid these inconveniences, it is possible to divide the reaction into two stages: first, a predetermined amount (per the foregoing considerations) of the vinyl-containing organopolysiloxane as element (A) is mixed with a similarly predetermined amount of the epoxy-containing organohydrogenpolysiloxane as element (B) to thereby produce an organosiloxane compound; then a surface active agent and water is added to the product to thereby emulsify it; finally, the emulsion thus prepared is combined with the Pt-containing catalyst as element (C) whereby the combination of the three elements (A), (B), and (C) is achieved and thus the organosiloxane compound is hardened. If the catalyst employed as element (C) is of the type that does not disperse in water, an emulsifier may be added to the catalyst to render it capable of dispersing in water, before adding it to the other elements.

In the case where a combination of elements (A), (B), and (C) is prepared at first and then it is dispersed in water, it is possible to dose an amount of a reaction decelerator in addition to the Pt-containing catalyst in order to prevent the hardening reaction from occurring before completion of dispersion of the elements. After dispersing in water the combination consisting of the three elements (A), (B) and (C), and the reaction decelerator, the reaction system is heated to a temperature of 50 to 70° C. or higher at which the deceleration effect of the reaction decelerator is completely debilitated and the hardening reaction starts to produce fine particles of elastomer.

Suitable reaction decelerators to accompany the Pt-containing catalyst include any known ones, such as acetylenic compounds, benzotriazole, nitrides of aromatic heterocyclic compounds, pyridazine, pyrazine, quinoline, piperidine, naphthylidine, quinaldine, dialkylformamide, thioamide, alkylthiourea, ethylene thiourea, and polymethylvinylsiloxane cyclic compounds.

As described above, a surface active agent is used to effect dispersion of the organopolysiloxane compound in water. This surface active agent can be any known one which can emulsify such compounds. Preferred examples are nonionic emulsifiers which have HLB (hydrophile-lypophile balance) values of 10 to 15, such as polyoxyethylenealkylphenyl ether and polyoxyethylenealkyl ether. Such emulsifiers may be used singly or in combination.

In order to ensure high miscibility with organic resins and that there will be a modification effect on the latter by the elastomers produced by this invention, it is necessary to keep the volume mean particle size of the elastomer fine particles less than 20 μm when measured by the procedure hereinafter described; this necessitates sufficiently fine emulsification and dispersion of the compound before it hardens. To facilitate the fine dispersion, it is suggested to employ the phase inversion emulsification method. For example, in the case of the two-step method described above, the respective predetermined amounts of the two components (A) and (B) are mixed together before the emulsification. To this is added the emulsifier and water to thereby obtain a W/O type emulsion. Water is then added further to convert the phase into an O/W type emulsion. The component (C) is added to the O/W type emulsion either directly or after it is rendered capable of being dispersed in water by addition of a surface active agent. The amount of water required to sufficiently effect the phase conversion is from 10 to 50 weight parts per 100 weight parts of the organopolysiloxane and the organohydrogenpolysiloxane combined.

The phase inversion emulsification can be properly conducted through known procedures in which a homogenizer mixer, etc., are used. The resulting emulsion can be dispersed and homogenized by means of known apparatus such as any homogenizer on the market.

If a filter is used to separate the silicone elastomer fine particles from the silicone elastomer emulsion thus obtained, a filter medium of a highly fine mesh is required. Such a filter medium is liable to be easily clogged thereby thwarting smooth separation. In order to avoid clogging of the filter medium and to secure smooth separation, it is effective to add an inorganic salt to the emulsion to thereby agglomerate the emulsion particles before filtration. It is possible to control the degree of agglomeration of the emulsion particles through modification of the conditions of adding the inorganic salt, e.g., stirring conditions, amount of salt added, identity of salt added, temperature, etc. Conditions for a given agglomeration can be routinely determined. Further, the resultant ionic impurities are easily removed by washing the filter slurry with water or an organic solvent several times. Similarly, the surface active agent used for the emulsification can be virtually completely removed by washing the filter slurry with an organic solvent such as alcohol.

The inorganic salt used to agglomerate the emulsion particles can be potassium chloride, sodium chloride, calcium chloride, magnesium sulfate, sodium sulfate, zinc sulfate, calcium nitrate, etc. The addition amount of the inorganic salt is from 1 to 30 weight parts per 100 weight parts of the emulsion, preferably from 3 to 20 weight parts per same. If the addition amount is less than one weight part, the agglomeration of the particles does not take place sufficiently, and if greater than 30 weight parts, the maximum solubility is exceeded and no further improvement occurs and will degrade the effect of the later washing. It is possible to use an alcohol in addition to the inorganic salt to further facilitate the agglomeration of the emulsion particles as is known.

The thus agglomerated emulsion particles can be separated by means of a filter, and the slurry sufficiently dehydrated by a means such as a centrifuge and, thereafter, washed; after repeating the dehydration and the washing, the slurry is dried and thus a fine powder of the silicone elastomer is obtained.

It is preferred that the slurry be stirred or kept flowing by means of a fluidizing dryer while it is dried so that agglomeration during drying is minimized. If washing is conducted intensively, there will be no need of using special cracking means during the drying process, because the agglomerate will be cracked by the fluidized drying itself and, as a result, virtually spherical fine particles will be isolated.

Use of the elastomer particles of this invention to modify organic resins is in accordance with conventional considerations, e.g., as described in the above-cited references.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosures of all applications, patents and publications, cited above and below, and of corresponding application Japanese 2-137925, filed May 28, 1990, are hereby incorporated by reference.

EXAMPLES

Synthesis 1

A methylhydrogenpolysiloxane which exhibits a viscosity of 170 cS at 25° C. and contains

in an amount of 0.745 mol/100 g and has the following formula was employed

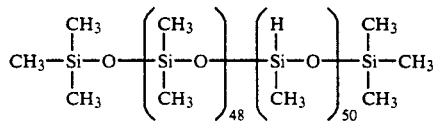

[The molar ratio of $\diagup\!\!\!\!\!\!\diagdown\mathrm{Si-H}/-\mathrm{CH}=\mathrm{CH}_2$ is 5.0.]

Fifty parts of toluene as the solvent and an amount of chloroplatinic olefin complex salt as the catalyst containing 0.001 part of Pt were added to 67.1 parts of the methylhydrogenpolysiloxane; into this liquid mixture was dripped 11.4 parts of allyl glycidyl ether, which took two hours during which the mixture was stirred and the temperature was maintained at 25° C. Then, the mixture was kept stirred at 25° C. for 6 hours to effect reaction; thereafter, the mixture was cooled and treated with activated carbon to thereby remove the Pt-containing catalyst by adsorption; finally the solvent and the unreacted materials were removed by stripping and a compound a was obtained.

Syntheses 2 and 3

Except that 22.8 parts or 34.2 parts of allyl glycidyl ether instead of 11.4 parts of the same were dripped, exactly the same procedure was observed, and compounds b and c were obtained, respectively.

The general formula of the compounds a, b and c was found to be as shown below, and the general properties are given in Table 1.

TABLE 1

$$CH_3-SiO\left(\underset{CH_3}{\underset{|}{SiO}}\right)_{48}\left(\underset{CH_3}{\underset{|}{SiO}}\right)_M\left(\underset{CH_3}{\underset{|}{SiO}}\right)_N-\underset{CH_3}{\overset{CH_3}{\underset{|}{Si}}}-CH_3$$

with substituents $CH_3$, $H$, and $(CH_2)_3OCH_2CH\overset{O}{\underset{}{-}}CH_2$

| Compounds | M | N | Si—H Content | Viscosity (cS) | Volatile Component (%) |
|---|---|---|---|---|---|
| a | 40 | 10 | 0.509 | 168 | 1.8 |
| b | 30 | 20 | 0.334 | 226 | 2.4 |
| c | 20 | 30 | 0.197 | 308 | 2.0 |

Note: Si—H content is in terms of "mol/100 g".

A hundred parts of dimethylpolysiloxane which has its molecular ends terminated by dimethylvinylsiloxyl groups and exhibits a viscosity of 100cS at 25° C.

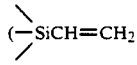

content is 0.040 mol/100 g) were reacted with 9.4 parts of the compound a obtained by Synthesis 1, and a composition was produced wherein the molar ratio of Si—H groups to Si—CH=CH$_2$ groups was 1.2. Next, 30 parts of this compound was mixed with one part of polyethyleneoctyl-phenyl ether having an HLB value of 13.5 as the surface active agent. Then the mixture was emulsified by the phase inversion emulsification method wherein 69 parts of water was added and the mixture was mixed with a homogenizer mixer. The mixture was then homogenized by being passed through a Gaulin homogenizer at a pressure of 316 kg/cm$^2$; as a result, an emulsion of a volume mean particle size of about 3.2 μm was obtained. An amount of chloroplatinic olefin complex salt containing 0.001 part of Pt was added to 100 parts of this emulsion, and the mixture was stirred at 25° C. and allowed to undergo a reaction for 20 hours; as a result, a silicone elastomer emulsion of a volume mean particle size of 3.6 μm was obtained. Then, five parts of sodium sulfate was added to 100 parts of this emulsion and the mixture was heated at 85° C. whereby the emulsion was destroyed and agglomeration of the emulsion particles occurred. This slurry was dehydrated in a centrifuge equipped with a filter medium of 400 mesh, and a cake substance of which the water content was 30% was obtained. This cake was washed and stirred with 200 parts of water which was purified by ion exchange and the slurry was dehydrated in a similar centrifuge. The cake of 30% water content which was obtained after repeating this washing operation two more times, was dried in a hot air circulation-type fluidizing dryer (FLO-5A manufactured by Ogawara Manufacturing Co., Ltd., Japan) under the condition that the entrance temperature was 100° C. and the exit temperature was 60° C.; as a result, a silicone elastomer spherical fine powder 1 was obtained. Its volume mean particle size was about 6 μm; the water content was 0.1%; the toluene extract accounted for 0.5%.

Example 2

A hundred parts of polymethylvinylsiloxane, which has its molecule's ends terminated by trimethylsilyl groups, consists of 95 mol % of dimethyl siloxane units and 5 mol % of methylvinyl siloxane units and exhibits a viscosity of 700cS at 25° C.

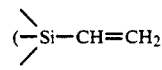

content is 0.065 mol/100 g), were reacted with 23.4 parts of the compound b obtained by Synthesis 2, and a composition was produced wherein the molar ratio of

group to Si—CH=CH$_2$ group was 1.2. Next, 30 parts of this compound was mixed with one part of the same surface active agent used in Example 1 and 69 parts of water to thereby obtain an emulsion through the same phase inversion emulsification conducted in Example 1. After the mixture was homogenized by the homogenizer, the resulting emulsion had a volume mean particle size of about 4.5 μm. Like in Example 1, an amount of chloroplatinic olefin complex salt containing 0.001 part of Pt was added to 100 parts of this emulsion, and the mixture was stirred at 50° C. and allowed to undergo a reaction for 6 hours; as a result, a silicone elastomer emulsion of a volume mean particle size of 6 μm was obtained. Then, in the similar manner as in Example 1, sodium sulfate was added to this emulsion, which was thus destroyed and agglomerated; the slurry was dehydrated, washed and dried. As a result, a silicone elastomer spherical fine powder 2 was obtained.

Example 3

Except that a hundred parts of the same polymethylvinylsiloxane used in Example 2 were reacted with 39.6 parts of the compound c obtained by Synthesis 3 and a composition was produced wherein the molar ratio of

group to Si—CH=CH$_2$ group was 1.2, the same procedure was observed as in Example 2 to form a silicone elastomer spherical fine powder 3.

The general properties of these powders, 1, 2, 3 are given in Table 2.

The measurements of those properties were conducted in accordance with the following procedures. The values of the same properties that appear in the other examples were also taken by the same procedures.

(1) Measurement of

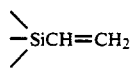

content

About 0.5 g of the sample is accurately measured and dissolved in 15 ml of carbon tetrachloride, and to this is added 25 ml of Hanus' agent (acetic acid solution of 0.2N iodine bromide); the solution is kept in a dark room at 25° C. for two hours to thereby allow the vinyl groups to react. Fifteen milliliters of 20 wt. % aqueous solution of potassium iodide is charged, and the freed iodine is titrated with a standard aqueous solution of 0.1N sodium thiosulfate until a starch indicator indicates that the end point is reached. From the amount of the iodine consumed, the content of

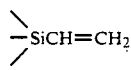

is calculated.

(2) Measurement of

content

About 0.5 g of the sample is accurately measured and suspended in 15 ml of n-butanol. To this is added 25 ml of KOH (20% KOH in water and methanol) and the

group is allowed to react for about five minutes; the volume of the generated hydrogen gas is measured and compensated by pressure; from the result of this, the content of is calculated based on the fact that one mol of hydrogen gas occupies 22,400 ml under normal conditions.

(3) Measurement of epoxy group content

About 2 g of silicone elastomer fine powder is accurately measured and charged in a 100-ml flask, and this is dissolved or suspended in 10 ml of chloric acid-dioxane solution (freshly prepared immediately before use, by mixing 1.5 ml of conc. chloric acid with 100 ml of refined dioxane), and the mixture is let to stand for 10 minutes; thereafter, about 20 to 30 ml of neutral ethyl alcohol is added and the excessive part of the chloric acid is titrated with 0.1N caustic soda solution until phenolphthalein used as the indicator indicates that the end point is reached, and the epoxy group content is calculated.

(4) Measurement of the electric conductivity of extracted liquid and the concentration of surface active agent in the extracted liquid About 6 g of silicone elastomer fine powder is measured accurately, and charged into a stainless steel container together with 150 g of water passed through ion exchange resin (electric conductivity less than 1 $\mu$S/cm); after sealing the container, it is carefully placed in a constant-temperature chamber where it is heated at 121°±3° C. for 20 hours to thereby effect extraction. After the extraction, the extracted liquid is filtered through a filter paper which is once washed with water passed through ion exchange resin; then the electric conductivity of the extracted liquid and the concentration of the surface active agent in the extracted liquid are measured. An electric conductivity measurement device manufactured by Tokyo Toa Electronics Co., Ltd., Japan, is used for the measurement of the electric conductivity. The concentration of the surface active agent is obtained by applying the result of the measurement of the surface tension of the extracted liquid to a surface tension analytical curve. A surface tension measurement device manufactured by Kyowa Science Co., Ltd., Japan, is used for the measurement of surface tension.

(5) Measurement of volume mean particle size and particle size distribution

About 0.1 to 0.2 g of the silicone elastomer fine powder is well ground with an agate mortar, and dispersed in about 20 g of water containing a nonionic surface active agent. The volume mean particle size and particle size distribution are obtained by Coulter counter (manufactured by Coulter Electronics Corporation). Incidentally, the emulsion samples were measured after they were diluted with water until they had the same concentration as above.

TABLE 2

| Properties | Examples | | |
| --- | --- | --- | --- |
| | Example 1 (Fine Powder 1) | Example 2 (Fine Powder 2) | Example 3 (Fine Powder 3) |
| Appearance | White Powder | White Powder | White Powder |
| Volatile Component (%) (105° C.: 3 hours) | 0.1 | 0.1 | 0.1 |
| Toluene Extract Component (%) | 0.9 | 1.1 | 1.2 |

TABLE 2-continued

|  | Examples | | |
| --- | --- | --- | --- |
| Properties | Example 1 (Fine Powder 1) | Example 2 (Fine Powder 2) | Example 3 (Fine Powder 3) |
| Bulk Density (g/cc) | 0.39 | 0.44 | 0.42 |
| Electric Conductivity of Extracted Water (μS/cm) | 36 | 30 | 32 |
| Concentration of Surface Active Agent in Extracted Water (%) | 0.001 | 0.001 | 0.001 |
| Volume Mean Particle Size (μm) | 4 | 6 | 8 |
| Particle Size Distribution (Percent of Particles sized ≧ 50 μm) | 0 | 0 | 0 |
| Epoxy Group Measured Content Calculated (mol/100 g) | 0.008 0.011 | 0.031 0.042 | 0.062 0.084 |

Synthesis 4

To 64.2 parts of methylhydrogenpolysiloxane

content 0.937 mol/100 g) consisting of 60 mol % of dimethylhydrogensiloxane units [(CH$_3$)$_2$HSiO$_{0.5}$] and 40 mol % of SiO$_2$ unit were added 50 parts of toluene as the solvent and an amount of chloroplatinic olefin complex salt as the catalyst containing 0.001 part of Pt; 49.2 parts of vinylcyclohexene epoxide was dripped into the mixture liquid while the liquid was being stirred and kept at 25° C. for 2 hours. The liquid was further stirred and kept at 25° C. for 6 hours during which reactions were allowed to take place; thereafter the liquid was cooled and treated with activated carbon which adsorbed and removed the platinic catalyst; then, the solvent and the unreacted substances were removed by stripping; as a result a compound d was obtained. The compound d contained 0.176 mol/100 g of

and had a viscosity of 18 cS.

Example 4

A hundred parts of dimethylpolysiloxane which has its molecular ends terminated by dimethylvinylsiloxyl groups and exhibits a viscosity of 400 cS at 25° C.

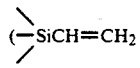

content is 0.0185 mol/100 g) were reacted with 13.0 parts of the compound d obtained by Synthesis 4, and a composition was produced wherein the molar ratio of

groups to Si—CH═CH$_2$ groups was 1.2. Next, this composition was emulsified and dispersed by the same method as in Example 1 whereby an elastomer emulsion having a volume mean particle size of 4.6 μm was obtained. Then, in the similar manner as in Example 1, sodium sulfate was added to this emulsion, which was thereby destroyed and agglomerated; the slurry was dehydrated, washed and dried. As a result, a silicone elastomer fine powder 4 was obtained.

Comparative Example 1

A hundred parts of dimethylpolysiloxane which has its molecular ends terminated by dimethylvinylsiloxyl groups and exhibits a viscosity of 400 cS at 25° C.

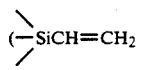

content is 0.0185 mol/100g were reacted with 17.1 parts of methylhydrogenpolysiloxane which has its molecular ends terminated by trimethysiloxyl groups and exhibits a viscosity of 170 cS at 25° C.

content is 0.745 mol/100g) and 10 parts of allyl glycidyl ether, and a composition was produced wherein the molar ratio of

group to vinyl group was 1.2. Next, this composition was mixed with 3 parts of the same surface active agent used in Example 1 and 297 parts of water, and was emulsified and dispersed by the same method as in Example 1 whereby an emulsion having a volume mean particle size of 3 μm was obtained. Then, in a similar manner as in Example 1, a Pt-containing catalyst was added to the emulsion and the emulsion was allowed to undergo reactions at 50° C. for 6 hours, whereby a part of the emulsion was agglomerated and an oil-like material floated on the surface level of the emulsion. Then, sodium sulfate was added to this emulsion, which was thereby destroyed and agglomerated; the resulting slurry was dehydrated, washed and dried. As a result, a silicone elastomer fine powder 5 was obtained. This material was a fine powder mixed with gross particles of rubber-like agglomeration having a particle size of 200 μm or greater; the general properties are shown in Table 3. A volatile component and a toluene extract portion which are thought attributable to unreacted allyl glycidyl ether were detected.

Comparative Example 2

A hundred parts of the same dimethylpolysiloxane used in Example 1 were mixed with 34.2 parts of methylhydrogenpolysiloxane and 20 parts of allyl glycidyl ether, and a mixture 1 was obtained. A mixture 2 was prepared by mixing 100 parts of the same dimethylpolysiloxane and an amount of chloroplatinic olefin complex salt containing 0.001 part of Pt. Next, the mixtures 1 and 2 were separately cooled until their temperatures reached 5° C. or lower, and they were mixed together without allowing the temperature to increase higher than 5° C.; then while keeping the temperature below 5° C., 6 parts of the same surface active agent used in Example 1 and 564 parts of cooled water of 5° C. were charged and the mixture was mixed and homogenized by the homogenizer mixer; while emulsification took place, addition reactions proceeded and as a result, the emulsion thus obtained partly contained nonemulsified silicone rubber particulate hard matter having a particle size of 200 μm or greater. It was impossible to measure the mean particle size of this emulsion, and when it was filtered through a filter medium of 80 mesh, the silicone rubber particulate hard matter having a particle size of 200 μm or greater was found to account for about 20% of the emulsion.

Comparative Example 3

After adding a Pt-containing catalyst to the same emulsion obtained in Example 1 having a mean particle size of 3 μm, the mixture was kept at room temperature for one hour, and then sprayed and dried in Spray Dryer GA-31 (manufactured by Yamato Science co., Ltd., Japan) with the entrance temperature kept at 150° C. and the exit temperature at 80° C.; as a result, a silicone elastomer fine powder 6 containing 0.8% of water was obtained. The general properties of this elastomer are as shown in Table 3. Both the electric conductivity of the extracted water and the concentration of the surface active agent were found significantly high, which is probably attributable to the existence of the surface active agent.

The properties of fine powders 4, 5 and 6 were also measured in the same manner as employed in Examples 1 through 3, and the results are shown in Table 3.

TABLE 3

| Properties | Example 4 (Fine Powder 4) | Comparative Example 1 (Fine Powder 5) | Comparative Example 3 (Fine Powder 6) |
|---|---|---|---|
| Appearance | White Powder | White Powder | White Powder |
| Volatile Component (%) (105° C.: 3 hours) | 0.2 | 0.7 | 0.4 |
| Toluene Extract Component (%) | 0.5 | 6.0 | 3.2 |
| Bulk Density (g/cc) | 0.43 | 0.52 | 0.22 |
| Electric Conductivity of Extracted Water (μS/cm) | 33 | 45 | 91 |
| Concentration of Surface Active Agent in Extracted Water (%) | 0.01 | 0.01 | ≧0.5 |
| Volume Mean Particle Size (μm) | 5 | 22 | 24 |
| Particle Size Distribution (Percent of Particles sized ≧ 50 μm) | 0 | 10 | 18 |
| Epoxy Group Content Measured (mol/100 g) | 0.032 | 0.027 | 0.025 |
| Epoxy Group Content Calculated (mol/100 g) | 0.041 | 0.069 | 0.069 |

Example 5 and Comparative Example 4

The silicone elastomer fine powders 1-6 obtained respectively in Examples 1-4 and Comparative Examples 1 and 3 were separately mixed with various substances in relative amounts indicated in the Recipe Table below; each mixture was uniformly mixed by a Henshel mixer, and kneaded by a biaxial roller for five minutes during which it was kept at a temperature between 80° and 100° C.; the kneaded material was then frozen, broken and tableted to produce epoxy resin compound tablets for sealing semiconductor devices. In addition to these, a mixture was also prepared in accordance with the Recipe Table except that no silicone elastomer fine powder was included, and a compound was produced.

Recipe Table

| Resins | |
|---|---|
| epoxy resin | 15.00 parts |
| flame-proof epoxy resin | 1.8 parts |
| phenolic resin hardener | 8.2 parts |
| Additives | |
| filler (silica) | 70.0 parts |
| release agent (carnauba wax) | 0.3 part |
| pigment (carbon black) | 0.3 part |
| surface active agent (KBM-403*) | 0.4 part |
| antimony trioxide | 2.0 parts |
| silicone elastomer fine powder | 2.0 parts |

*KBM-403: α-glycidoxypropyltrimethoxyl silane manufactured by Shin-Etsu Chemical Co. Ltd., Japan With reference to the Recipe Table, the epoxy resin used as o-cresol novolak resin (epoxy equivalent 196; softening point 78° C.); the flameproof epoxy resin was brominated bisphenol-A epoxy resin (epoxy equivalent 270; softening point 80° C.); and the phenol resin curing agent was phenol novolak resin (hydroxyl group equivalent 106; softening point 83° C).

The silicone elastomer fine powder manufactured by the method of the present invention proved to have high miscibility with the resins, and therefore it was easy to prepare the resin compounds in accordance with the Recipe Table.

The resin compounds were separately molded by a low pressure transfer molding machine (50-Ton press manufactured by Toa Seiki Co., Ltd,. Japan) under a condition of 180° C., 70 kg/cm², 2 minutes; then the molded resin was hardened by heating it at 180° C. for one hour. Two kinds of square test pieces were made from the resin for thermal shock resistance tests for evaluation as FP (flat package) type IC devices: one measured 6 mm×6 mm×0.7 mm, and the other 6 mm×6 mm×0.9 mm. These pieces were subjected to a cross section inspection and a thermal shock resistance test as specified below.

Inspection of Cut Section

Each test piece was cut and its cross section was inspected with an electron microscope. As a result, it was found that in the test pieces containing one of the silicone fine powders 1-4, the powder was dispersed uniformly. The boundary between the epoxy resin and the silicone fine powder was indistinct, this tendency being more conspicuous when the epoxy content of the silicone fine powder is greater, which proves that the miscibility between the silicone fine powder and the epoxy resin is reinforced by the presence of epoxy group.

In the case of the test pieces containing the fine powder 5 or 6, obtained in comparative examples, the inspection of the cross section of each test piece showed that the silicone fine powder was dispersed unevenly, and the boundary between the epoxy resin and the silicone fine powder was distinct. Thus, it was found that the miscibility between the silicone fine powder and the epoxy resin was poor.

Thermal Shock Resistance Test (Moisture Absorption Soft Solder Test)

Ten pieces each of fourteen different test devices (see above) classified by the fine powder used and by the thickness, were prepared, and they were placed in a thermo-hygrostat for 24 hours in which the temperature was maintained at 85° C. and the humidity at 85%; the coefficient of water absorption was measured. The same test pieces were then separately steeped in a soft solder bath and the time was measured till each piece cracked. The temperature of the soft solder bath was 215° C. when the thickness of the test piece was 0.7 mm; it was 240° C. when the thickness was 0.9 mm. The result of the measurements are as given in Table 4.

TABLE 4

| | | Coefficient of Water Absorption (%) | | Moisture Absorption Soft Solder Test (seconds) | |
|---|---|---|---|---|---|
| | | 0.7 mm thick | 0.9 mm thick | 0.7 mm thick | 0.9 mm thick |
| Example 5 | Fine Powder 1 | 0.39 | 0.33 | 6.8 | 7.0 |
| | Fine Powder 2 | 0.37 | 0.32 | 8.2 | 10.0 |
| | Fine Powder 3 | 0.38 | 0.31 | 10.3 | 13.1 |
| | Fine Powder 4 | 0.40 | 0.34 | 7.9 | 9.6 |
| Comparative | Fine Powder 5 | 0.41 | 0.33 | 4.7 | 5.8 |
| tive | Fine Powder 6 | 0.42 | 0.35 | 5.2 | 6.7 |
| Example 4 | No powder was added | 0.44 | 0.40 | 6.2 | 6.4 |

As can be seen, according to the invention, it is possible to manufacture easily and stably a fine powder of epoxy-containing silicone elastomer which is not self-welding, is free of gross particles or impurities, is highly miscible with organic resins, and is effective in modifying such organic resins. With regard to the ability of modifying organic resins, for example, it is possible to improve the thermal shock resistance of an epoxy resin compound for sealing a semiconductor device by adding an appropriate amount of epoxy containing silicone elastomer fine powder before molding the compound. Thus, the usefulness of the invention is high.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method for preparing a fine powder of epoxy-containing silicone elastomer comprising:
   (i) dispersing in water a hardenable organopolysiloxane compound consisting essentially of:
      (A) an organopolysiloxane having a viscosity of 20-100,000 cS at 25° C. and a formula

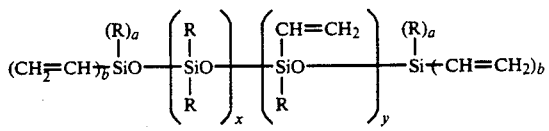

wherein the R's are the same or different, unsubstituted or substituted hydrocarbon groups containing no unsaturated bond; subscripts a and b are integers 0, 1, 2 or 3 whereby $a+b=3$; x is a positive integer and y is 0 or a positive integer, whereby $2b+y \geq 2$;

(B) an organohydrogenpolysiloxane containing, in each molecule thereof, at least two hydrogen atoms bonded to silicon and at least one epoxy-bearing organic group bonded to silicon and having a formula

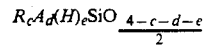

wherein R is independently as defined above; A is an epoxy-bearing organic group; c is a number from 0 to 3, and d and e are numbers from 0.005 to 2.0, whereby $0.8 < c+d+e < 3$; and (C) a Pt-containing catalyst;
   (ii) hardening the formed particles dispersed in the aqueous medium to obtain a silicone elastomer dispersion of particles having a mean diameter of 20 μm or smaller; and
   (iii) isolating the resultant particles.

2. A method of claim 1 wherein the step of isolating the resultant particles comprises:
   adding an organic salt to the dispersion to coagulate and facilitate separation of the hardened dispersed particles; and
   isolating the particles by filtration.

3. A method of claim 2 further comprising washing and drying the isolated particles.

4. A method of claim 1, comprising mixing component (A) with component (B), dispersing the mixture and then adding catalyst component (C).

5. A method of claim 4, wherein the dispersion is formed by the phase inversion emulsification method.

6. A method of claim 1, wherein the dispersion is formed with the aid of an emulsifying agent.

7. A method of claim 2, wherein the amount of salt added is 1-30 wt. parts per 100 wt. parts of the dispersion.

* * * * *